Reissued May 8, 1928.

Re. 16,956

UNITED STATES PATENT OFFICE.

JOSEPH BLUMENFELD, OF LONDON, ENGLAND, ASSIGNOR, BY MESNE ASSIGNMENTS, TO COMMERCIAL PIGMENTS CORPORATION, A CORPORATION OF DELAWARE.

TITANIUM PIGMENT.

No Drawing. Original No. 1,504,673, dated August 12, 1924, Serial No. 652,189, filed July 17, 1923. Application for reissue filed August 9, 1926. Serial No. 128,323.

This invention relates to a process for transforming by physico-chemical means precipitated oxide or hydroxide of titanium into a pigment which consists of either pure oxide of titanium or of a mixture of the same with other substances, such as are usually employed as fillers, for example, barium sulphate, silica, kaolin and the like.

The invention also relates to the pigments obtained by means of this process. This pigment is characterized by a well defined state of division of all or part of the oxide or hydroxide of titanium, which state of division confers on the pigment particularly valuable properties for employment in paints, enamels and the like.

Among the characteristics which make the value of a pigment the covering power, mechanical resistance of the film and its adhesive power, stability to light and to chemical agents, and miscibility with oil are generally specified. All these properties vary very rapidly with its state of division below any which can be obtained by ordinary mechanical grinding. This state of division thus is a fundamental characteristic of a good pigment.

All known processes for the preparation of a pigment with titanium compounds as base advocate the oxide or hydroxide of titanium being precipitated in a state which is convenient for their being employed as a pigment, that is to say, in a sufficiently fine state of division. Inconveniences result from this which affect either the chemical side of the manufacture (separation from mother liquor, washing of precipitate and its purification, etc.), or the quality of the pigment itself (impossibility of always obtaining the same state of division and limit of degree of this state).

The problem of determining the fundamental causes for the variability of pigmentary qualities of different titanium oxides has been investigated and it was found that this variability is connected with the size of the particles from which the oxide is formed. It has been verified that to obtain a good pigment it is necessary that the particles be small, but it was discovered at the same time that it is indispensable that the particles should be of different sizes. Very good results are obtained when the microscope shows that large and small particles have such a proportion both as to number and size that the space between them is as completely filled as possible, the smaller particles grouping themselves in the spaces between the larger, and thus securing the continuity and cohesion of the whole just in the same way as in the case of concrete.

By the utilization of this principle a still better pigment has been discovered and methods of securing with certainty the production thereof. In this pigment a certain proportional quantity of the oxide is in a state of division, characterized by the presence of particles which are both ultra-microscopic and smaller, giving with linseed oil or other vehicles which can be employed, a colloidal solution. This colloidal solution after drying leaves a film which is exceptionally adhesive, owing to molecular forces coming into play. This film acts both as a sub-stratum and as an agglutinant for the larger particles of the pigment and thus secures opacity.

Another fundamental fact is that no ordinary treatment either of a mechanical or thermal nature is able to sub-divide the ultimate particles of titanium compounds once made by the wet method (i. e. by hydrolysis of sulphate solutions). In consequence, these treatments cannot transform into a pigment with the above characteristics, a precipitated oxide or hydroxide of titanium, which does not possess the required qualities. On the contrary, a precipitate possessing these particular qualities will preserve them through all the ordinary mechanical or thermal treatments.

The invention consists in producing colloid titanium compounds by the peptization of precipitated titanium compounds with suitable quantities of peptizing agents to give the desired physical characteristics for various purposes.

The invention also consists in producing titanium pigments by the peptization of precipitated titanium compounds with suitable quantities of peptizing agents.

The invention further consists in producing titanium pigments by peptization of titanium compounds precipitated from crystalloid solutions.

The invention also consists in transforming into pigment form, that is to say, conferring the above mentioned qualities on the colloidal products of all compounds of titanium, metallic titanates, etc., capable of being converted into the colloidal state, such as oxide or hydroxide of titanium, precipitated by hydrolysis, by means of an operation which is carried out before drying and dehydration. This effect is obtained by dispersing by processes of gradual peptization of oxide or hydroxide cleared from its electrolyte when pure products are desired. This dispersion is affected by means of small quantities of acid or alkali or salts of titanium, or of any substance which diminishes the surface tension of the liquid phase, causing dispersion. The operation takes place before, during or after the optional incorporation of substances usually employed as fillers. Every new addition of peptizing agent has the effect of increasing the degree of dispersion of the gel. Under these circumstances it is easy to establish the quantity of the reagents necessary in order to produce the desired state of division according to whatever purpose the pigment is to be used for.

On general lines these oxides or hydroxides of titanium have the following properties:—

1. Thinned out with water before drying they change—or at least a portion of them does—into a colloidal solution which has all the properties common to such solutions, for example, they are unfiltrable, opalescent, give the ordinary ultra-microscopic light effects and are capable of coagulation by means of the electrolytes especially by polyvalent acids.

2. When dried or dehydrated they do not disintegrate into powder but form clots which are easily reduced to powder by mechanical means.

3. This powder mixed with linseed oil makes a paste which contains ultra-microscopical particles. Due to the presence of these particles the paste has in reflected light a bluish colour or other colour according to the size of the particles, owing to the scattering of light by suspended particles. When dried in a thin layer the paste gives a very adhesive film.

4. When exposed to the light in contact with organic substances such as turpentine, essential oils and the like they do not change colour.

This stability is due to the fact that the traces of soluble titanium compounds have been eliminated. These soluble compounds under the action of light and of oxygen which is made active by those organic substances whose catalytic power is known are converted into the yellow pertitanic compounds.

*Example I.*

1 kilogram of $TiO_2$ in the form of metatitanic acid precipitated by hydrolysis and filtered is treated with ammonia in sufficient quantity to neutralize the sulphuric acid contained in the precipitate. The sulphate of ammonia formed is eliminated by washing. 20 grams of concentrated HCl are added. The mass becomes completely fluid and the phenomena of peptization occur. The whole is then dried and dehydrated and worked up into pigment with any suitable vehicle.

*Example II.*

1 kilogram of acid hydroxide of titanium obtained from sulphate by hydrolysis in known manner, is treated with chloride of barium in quantity equivalent to the sulphuric acid contained in the hydroxide. Hydrochloric acid is liberated by this reaction, which also precipitates barium sulphate in the mass, forming a "composite pigment". The sulphuric acid being transformed into an insoluble form, the peptization commences. The degree of dispersion can be decreased as desired by partial substitution of chloride of barium by carbonate or sulphide, or silicate of barium or calcium, or like agent capable (*a*) of neutralizing sulphuric acid, (*b*) of diminishing the amount of hydrochloric acid set free to act as peptizing agent, and (*c*) of giving products not harmfully affecting the resultant pigment. The dehydrated mass which results is not pure titanium pigment but a composite pigment. The degree of dispersion obtained depends on the quantity of the addition used.

*Example III.*

The sulphuric acid contained in 1 kilogram of metatitanic acid (titanium hydroxide) obtained from sulphate by hydrolysis in known manner is neutralized by carbonate of sodium and the sulphate of sodium formed is washed out by water. The hydroxide of titanium is then dispersed to the desired degree by adding chloride of titanium or chloride of silicon and the whole is dried and dehydrated.

*Example IV.*

To any pigment of poor quality which it is desired to improve 10 per cent to 20 per cent of titanium hydroxide which has been already peptized as above is added. The addition has the effect of improving to a very great extent the pigmentary qualities of the original pigment.

This process for preparing pigments of titanium base has the following advantages:—

1. It frees the chemical treatment of preparing oxide or hydroxide of titanium from difficulties of purification which the manufacture of a pigment requires and confines the chemical treatment only to chemical purposes.

2. It enables one to obtain without any limit the state of division of the material most suited for the pigment which is desired.

3. It enables one to fix quantitatively the state of division so as to obtain the greatest effect and to adjust this state of division to each particular need.

4. It enables one to change as desired in the pigment as above specified any constitutional element of its structure for another element with the same physical structure but of a different chemical composition such as sulphate of barium, silica, or other fillers.

Having now described my invention what I claim as new and desire to secure by Letters Patent is:—

1. Dehydrated peptized tetravalent titanium oxides.

2. A composition of matter comprising a peptized hydrolytically produced oxygen compound of titanium.

3. A process of forming titanium pigments which comprises precipitating a gel of titanic acid, peptizing said gel and drying and dehydrating said peptized gel.

4. An aqueous colloidal dispersion of peptized titanium dioxide.

5. A composition comprising colloidal particles of titanium dioxide peptized in water containing chlorine ions.

6. An unfiltrable aqueous colloidal dispersion of titanium dioxide and a peptizing agent.

7. An unfiltrable opalescent colloidal solution characterized in containing peptized titanium dioxide and being free from sulfuric acid.

8. A pigment containng dehydrated peptized titanium dioxide.

9. A paint containing dehydrated peptized titanium dioxide colloidally dispersed in an organic vehicle.

10. A process for producing an aqueous colloidal dispersion of titanium dioxide which comprises associating a peptizing agent with precipitated titanium dioxide free from sulfuric acid.

11. A process for producing an aqueous colloidal dispersion of titanium dioxide which comprises hydrolyzing a titanium sulfate solution, removing adsorbed acid from the precipitate, and associating a peptizing agent containing chlorine ions with said precipitate.

12. A process for producing an aqueous colloidal dispersion of titanium dioxide which comprises hydrolyzing a titanium sulfate solution, removing adsorbed sulfuric acid from the precipitate and associating hydrochloric acid with said precipitate.

13. A process for producing an aqueous colloidal dispersion of titanium dioxide which comprises hydrolyzing titanium sulfate and treating the precipitate with the chloride of an alkaline earth metal.

JOSEPH BLUMENFELD.